United States Patent
Niu et al.

(10) Patent No.: US 12,517,862 B2
(45) Date of Patent: Jan. 6, 2026

(54) CONFIGURABLE PROCESSING ARCHITECTURE

(71) Applicant: Alibaba Group Holding Limited, Grand Cayman (KY)

(72) Inventors: Dimin Niu, Sunnyvale, CA (US); Tianchan Guan, Shanghai (CN); Hongzhong Zheng, Sunnyvale, CA (US); Shuangchen Li, Los Gatos, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 12 days.

(21) Appl. No.: 18/027,078

(22) PCT Filed: Sep. 18, 2020

(86) PCT No.: PCT/CN2020/116158
§ 371 (c)(1),
(2) Date: Mar. 17, 2023

(87) PCT Pub. No.: WO2022/056828
PCT Pub. Date: Mar. 24, 2022

(65) Prior Publication Data
US 2024/0028554 A1    Jan. 25, 2024

(51) Int. Cl.
G06F 15/80     (2006.01)
G06F 15/82     (2006.01)

(52) U.S. Cl.
CPC ............ *G06F 15/80* (2013.01); *G06F 15/825* (2013.01)

(58) Field of Classification Search
None
See application file for complete search history.

(56) References Cited

U.S. PATENT DOCUMENTS

| | | | |
|---|---|---|---|
| 8,710,863 | B2 | 4/2014 | Kilzer et al. |
| 8,812,746 | B2 | 8/2014 | Azam et al. |
| 8,819,505 | B2 | 8/2014 | Vorbach et al. |
| 9,235,680 | B2 | 1/2016 | Rooyen et al. |
| 9,298,607 | B2 | 3/2016 | Zimmer et al. |
| 9,547,038 | B2 | 1/2017 | Natarajan |
| 10,489,878 | B2 * | 11/2019 | Basso ................. H04N 23/951 |
| 11,171,651 | B2 | 11/2021 | Simar et al. |
| 11,449,441 | B2 | 9/2022 | Betser et al. |
| 11,675,500 | B2 | 6/2023 | Kim et al. |
| 2007/0162640 | A1 | 7/2007 | Johns et al. |

(Continued)

FOREIGN PATENT DOCUMENTS

| | | | |
|---|---|---|---|
| CN | 103262035 A | | 8/2013 |
| CN | 105045763 A | * | 11/2015 |
| EP | 1877927 B1 | * | 3/2011 ......... G06F 15/7867 |

*Primary Examiner* — Eric Coleman

(57) ABSTRACT

A configurable processing unit including a core processing element and a plurality of assist processing elements can be coupled together by one or more networks. The core processing element can include a large processing logic, large non-volatile memory, input/output interfaces and multiple memory channels. The plurality of assist processing elements can each include smaller processing logic, smaller non-volatile memory and multiple memory channels. One or more bitstreams can be utilized to configure and reconfigure computation resources of the core processing element and memory management of the plurality of assist processing elements.

17 Claims, 5 Drawing Sheets

(56) References Cited

U.S. PATENT DOCUMENTS

| | | | |
|---|---|---|---|
| 2008/0052490 A1* | 2/2008 | Botchek | G06F 15/7867 712/11 |
| 2008/0288728 A1 | 11/2008 | Farooqui et al. | |
| 2009/0327610 A1 | 12/2009 | David et al. | |
| 2012/0268163 A1 | 10/2012 | Kilzer et al. | |
| 2012/0271968 A1 | 10/2012 | Kilzer et al. | |
| 2013/0304979 A1 | 11/2013 | Zimmer et al. | |
| 2014/0371109 A1 | 12/2014 | McMillen et al. | |
| 2014/0371110 A1 | 12/2014 | Van Rooyen et al. | |
| 2015/0161415 A1* | 6/2015 | Kreft | H04L 9/0861 713/194 |
| 2016/0202320 A1 | 7/2016 | Natarajan | |
| 2016/0342721 A1* | 11/2016 | Larzul | G06F 30/392 |
| 2018/0143860 A1* | 5/2018 | Dasu | G06F 15/7867 |
| 2019/0155239 A1* | 5/2019 | Salhuana | G06F 8/456 |
| 2019/0340148 A1* | 11/2019 | Tan | G06F 13/4221 |
| 2020/0125503 A1* | 4/2020 | Graniello | G06F 15/7807 |
| 2020/0192603 A1* | 6/2020 | Tanriover | G06F 3/0659 |
| 2020/0403618 A1 | 12/2020 | Simar et al. | |
| 2021/0158155 A1* | 5/2021 | Zhang | G06N 3/048 |
| 2023/0259283 A1 | 8/2023 | Kim et al. | |

\* cited by examiner

CONFIGURABLE PROCESSING ARCHITECTURE

BACKGROUND OF THE INVENTION

Computing systems have made significant contributions toward the advancement of modern society and are utilized in a number of applications to achieve advantageous results. Numerous devices, such as desktop personal computers (PCs), laptop PCs, tablet PCs, netbooks, smart phones, servers, and the like have facilitated increased productivity and reduced costs in communicating and analyzing data in most areas of entertainment, education, business, and science. A number of technologies and applications need processing units optimized for performance with large data sets, having high computational intensity and high memory bandwidth. Other technologies and applications need processing units optimized for performance with smaller data sets, utilizing lightweight computations, and having low latency. Conventional central processing units (CPUs) generally provide for high memory capacity and high communication bandwidth, but relatively lower computational intensity. Conventional graphics processing unit (GPUs), in comparison, generally provide higher computational intensity, but with relatively low memory capacity and low communication bandwidth. Accordingly, there is a continuing need for a flexible processing architecture that can provide for high computation intensity, high memory capacity and high communication bandwidth.

SUMMARY OF THE INVENTION

The present technology may best be understood by referring to the following description and accompanying drawings that are used to illustrate embodiments of the present technology directed toward a processing architecture that can be configured and reconfigured. The processing architecture can be advantageously utilized for graph computing, neural network computing, graph neural network computing and the like.

In one embodiment, the processing unit can include a core processing element and a plurality of assist processing elements coupled together by one or more networks. The core processing element can include processing logic, such as but not limited to a field programmable gate array (FPGA), and non-volatile memory (NVM), such as but not limited to flash (FLASH) memory. The processing logic and non-volatile memory (NVM) of the core processing element can have configurable computation and memory resources. The plurality of assist processing elements can each include processing logic, such as but not limited to a field programmable gate array (FPGA), and non-volatile memory (NVM), such as but not limited to flash (FLASH) memory. The processing logic and non-volatile memory (NVM) of the assist processing elements can have configurable memory resources and connection topology. The processing unit can also include one or more input/output interfaces for receiving one or more bitstreams for configuring and reconfiguring the processing unit.

In one embodiment, configuring the processing unit can include accessing one or more configuration bitstreams. Accessing the one or more configuration bitstreams can include retrieving the one or more bitstreams from the non-volatile memory (NVM) of the plurality of assist processing elements and the core processing element, or receiving the one or more configuration bitstreams at one or more input/output interfaces from a host device. The core processing element, the plurality of assist processing elements and the one or more networks can be configured based on the one or more configuration bitstreams. Configuration of the processing unit can include, but is not limited to, the configuration of computational resources of the core processing element and memory management of the plurality of assist processing elements. One or more applications, including but not limited to one or more long short-term memory (LSTM) NN applications, one or more multilayer perception (MLP) NN applications, one or more gated recurrent unit (GRU) NN applications, one or more attention NN applications, one or more sum/mean NN applications and or the like, can then be executed on the configured processing unit.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
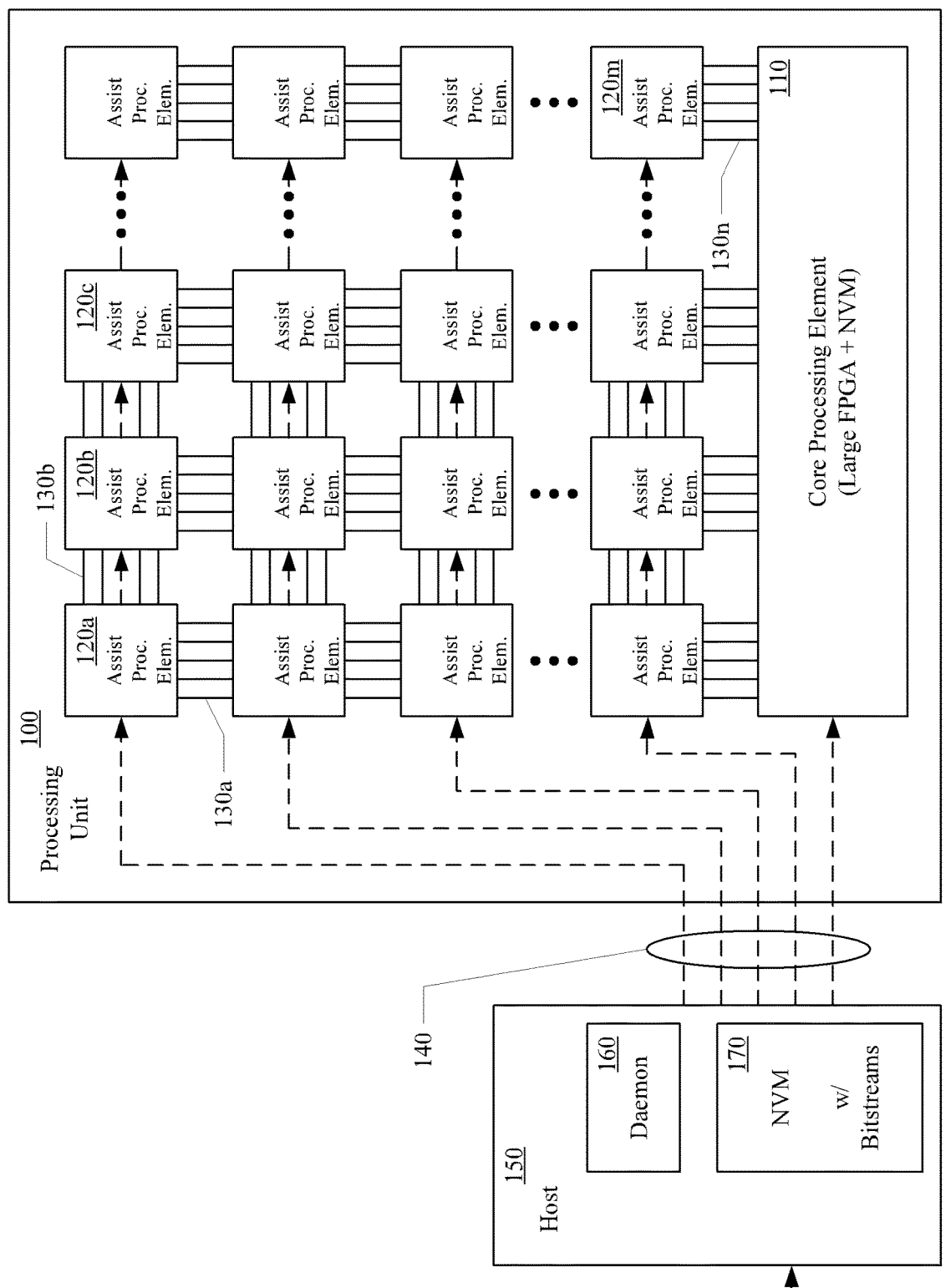
FIG. 1 shows a block diagram of a processing unit, in accordance with aspects of the present technology.

Reference will now be made in detail to the embodiments of the present technology, examples of which are illustrated in the accompanying drawings. While the present technology will be described in conjunction with these embodiments, it will be understood that they are not intended to limit the technology to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. The use of the terms "comprises," "comprising," "includes," "including" and the like specify the presence of stated elements, but do not preclude the presence or addition of one or more other elements and or groups thereof. It is also to be understood that although the terms first, second, etc. may be used herein to describe various elements, such elements should not be limited by these terms. These terms are used herein to distinguish one element from another. For example, a first element could be termed a second element, and similarly a second element could be termed a first element, without departing from the scope of embodiments. It is also to be understood that when an element is referred to as being "coupled" to another element, it may be directly or indirectly connected to the other element, or an intervening element may be present. In contrast, when an element is referred to as being "directly connected" to another element, there are not intervening elements present. It is also to be understood that the term "and or" includes any and all combinations of one or more of the associated elements. It is also to be understood that the phraseology and terminology used herein is for the purpose of description and should not be regarded as limiting.

FIG. 1 shows a block diagram of a processing unit, in accordance with aspects of the present technology. The processing unit 100 can include a core processing element 110 and a plurality of assist processing elements 120a-120m coupled together by one or more networks 130a-130n. In one implementation the core processing element 110 and the plurality of assist processing element 120a-120m can be coupled together by one or more configurable mesh networks 130a-130n. In a mesh network 130a-130n, the core processing element 110 and the plurality of assist processing element 120a-120m can be configurably coupled together, dynamically and non-hierarchically to as many others as possible and cooperate with one another to efficiently route data, instructions, control signals and the like. The processing unit 110 can also include one or more input/output interfaces 140. The one or more input/output interfaces 140 can be configured for coupling the processing unit 100 to a host device 150 or the like. In one implementation, the core processing element 110, the plurality of assist processing elements 120a-120m and the one or more networks 130a-130n can be implemented in a system-in-package (SiP). In another implementation, the core processing element can be implemented as a peripheral card, such as a peripheral component interface express (PCIe) card. The plurality of assist processing elements 120a-120m can be implemented as one or more additional peripheral cards, such as peripheral component interface express (PCIe) cards, with each peripheral card including one or more assist processing elements 120-120m.

The core processing element 110 can include configurable compute logic and non-volatile memory (NVM). In one implementation the configurable compute logic and NVM, of the core processing element 110 can be tightly coupled together. In one implementation, the core processing element 110 can include field programmable gate array (FPGA) and flash memory (FLASH). The core processing element 110 can include configurable graph compute functions. The core processing element 110 can also include configurable data flow functions.

The plurality of assist processing elements 120a-120m can include compute logic and non-volatile memory (NVM). The compute logic and non-volatile memory (NVM) of the assist processing element 120a-120m can be smaller than the compute logic and non-volatile memory (NVM) of the core processing element 110. In one implementation the configurable compute logic and NVM, of each respective assist processing element 120a-120m can be tightly coupled together. In one implementation, each respective assist processing element 120a-120m can include field programmable gate array (FPGA) and flash memory (FLASH). The assist processing elements 120a-120m can include multiple memory channels. In one implementation, the plurality of assist processing elements 120a-120m can be homogeneous with the same compute logic the same non-volatile memory, with the same memory capacity and the same memory channels between the compute logic and the non-volatile memory. In another implementation, the plurality of assist processing element 120a-120m can be heterogeneous, with one or more assist processing elements having different compute logic, different non-volatile memory, different memory capacities, different number of memory channels and or the like, different from one or more other assist processing elements.

The core processing element 110 can be configurable based on one or more configuration bitstreams. In one implementation, the computational resources of the core processing element 110 compute logic can be configured based on one or more configuration bitstreams. For example, allocation of computational resources of the core processing element 110 can be configured for a single graph neural network (GNN) application or for a plurality of GNN applications. The computational resources can also be allocated for optimization of inference, training, and or sampling modes of the one or more graph neural network (GNN) applications. In another example, one or more functions of the computational resources of the core processing element 110 can be configured. The one or more functions can be configured to implement long short-term memory (LSTM), multilayer perception (MLP), gated recurrent unit (GRU), attention, sum/mean and or other similar general neural network operations. In yet another example, a neural network node sampling strategy of the core processing element 110 can be configured. The node sampling strategy can include, but is not limited to, random and iterate for nodes, random or iterate for edges, and or edge weight, random, top K, in degree and window for neighbors. In yet another example, the operation (OP) instruction set of the core processing element 110 can be configured. The operation (OP) instruction set can include, but is not limited to, large, medium and small OP instruction sets. In another implementation, the memory resources of the core processing element 110 can be configured based on the one or more configuration bitstreams. For example, the memory capacity, number of memory channels, topology and or the like of the core processing element 110 can be configured.

The plurality of assist processing elements 120a-120m can also be configurable based on the one or more configuration bitstreams. In one implementation, memory management of the plurality of assist processing elements 120a-120m can be configured based on the one or more configuration bitstreams. For example, the memory capacity of the processing elements 120a-120m can be configured. In another implementation, the network interface of the plurality of assist processing elements 120a-120m can be configured based on the one or more configuration bitstreams. For example, the assist processing elements 120a-120m can be configured with one or more serial connections and or one or more parallel connections.

The one or more networks 130a-130n can also be configurable based on the one or more configuration bitstreams. In one implementation, the one or more configuration bitstreams can directly configure communication links between the plurality of assist processing elements 120a-120m and the core processing element 110. In another implementation, the one or more networks 130a-130n can be indirectly configured by the configuration of one or more serial interfaces and or one or more parallel interfaces of the assist processing elements 120a-120m and the core processing element 110.

In one implementation, the respective ones of the one or more configuration bitstreams can be stored in the non-volatile memory (NVM) of the respective ones of the plurality of assist processing elements 120a-120m and the respective core processing element 110. The processing unit 100 can be configured or reconfigured by loading different configuration bitstreams, via the one or more input/output interfaces 140, into the non-volatile memory (NVM) of the respective ones of the plurality of assist processing elements 120a-120m and the respective core processing element 110. In another implementation, the one or more configuration bitstreams can be received from a host device 150. The host device 150 can include a software daemon 160 and a non-volatile memory (NVM) 170. The NVM 170 of the host device 150 can store any number of configuration bitstreams. The software daemon 150 of the host device 140 can receive a user application programming interface (API) call 170 to configure or reconfigure the processing unit 100. The software daemon 150 can configure or reconfigure the plurality of assist processing elements 120a-120m and the core processing element 110 through the one or more input/output interfaces 140 of the processing unit 100 based on one or more configuration bitstreams stored in the non-volatile memory 170 of the host 150 in response to the application programming interface call 180.

Figure 2:
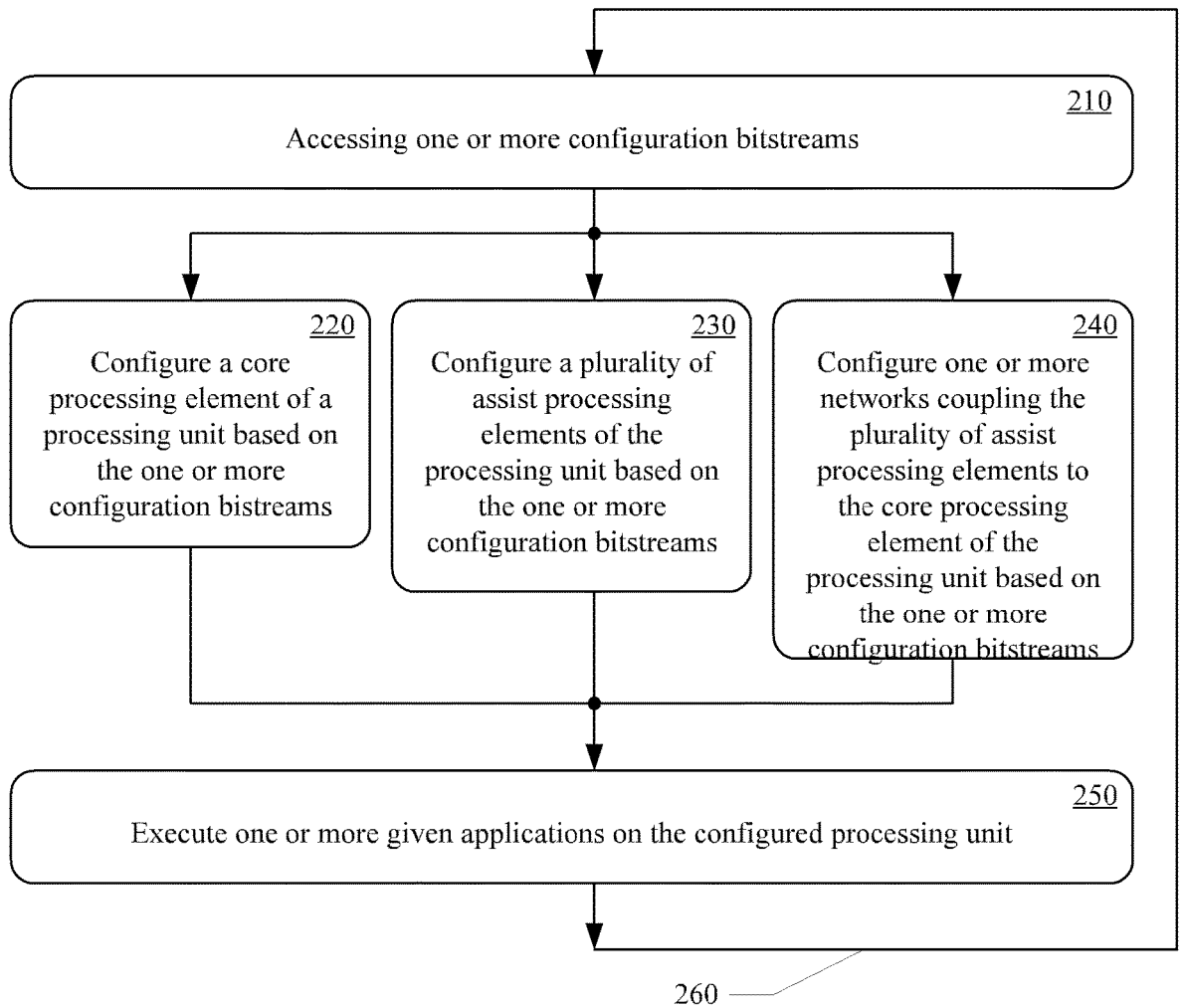
FIG. 2 shows a flow diagram of a method of configuring a processing unit, in accordance with aspects of the present technology.

Referring now to FIG. 2, a method of configuring a processing unit, in accordance with aspects of the present technology, is shown. The method of configuring a processing unit can begin with accessing one or more configuration bitstreams, at 210. In one implementation, accessing one or more configuration bitstreams can include retrieving configuration bitstreams stored in non-volatile memory (NVM) of respective ones of a plurality of assist processing elements and a respective core processing element of the processing unit. In another implementation, accessing the one or more configuration bitstreams can include receiving the one or more configuration bitstreams on one or more input/output interfaces of the processing unit. For example, a host device can send the one or more configuration bitstreams on the one or more input/output interfaces of the processing unit in response to an application programming interface (API) call received by the host device. The one or more configuration bitstreams can include configuration parameters related to executing one or more given applications on the processing unit. For example, the one or more configuration bitstreams can include configuration parameters related to executing one or more neural network (NN) applications on the processing unit.

At 220, the core processing element of the processing unit can be configured based on the one or more configuration bitstreams. In one implementation, computation logic of the core processing can be configured based on one or more configuration bitstreams. For example, allocation of computational resources of the computation logic can be configured for a single graph neural network (GNN) application or for a plurality of GNN applications. The computational resources can also be allocated for optimization of inference, training, sampling and or the like modes. In another example, one or more functions of the computation logic of the core processing element can be configured. The one or more functions can be configured to implement long short-term memory (LSTM), multilayer perception (MLP), gated recurrent unit (GRU), attention, sum/mean and or other similar graph neural network operations. In yet another example, a neural network node sampling strategy of the core processing element can be configured. The node sampling strategy can include, but is not limited to, random and iterate for nodes, random or iterate for edges, and or edge weight, random, top K, in degree and window for neighbors. In yet another example, the operation instruction set of the core processing element can be configured. The operation (OP) instruction set can include, but is not limited to, large, medium and small OP instruction sets. In another implementation, the memory resources of the core processing element can be configured based on the one or more configuration bitstreams. For example, the memory capacity, number of memory channels, topology and or the like of the core processing element can be configured.

At 230, the plurality of assist processing elements of the processing unit can be configured based on the one or more configuration bitstreams. In one implementation, memory management of the plurality of assist processing elements can be configured based on the one or more configuration bitstreams. For example, the memory capacity of the processing elements can be configured. In another implementation, the network interface of the plurality of assist processing elements can be configured based on the one or more configuration bitstreams. For example, the assist processing elements can be configured with one or more serial communication connections and or one or more parallel communication connections.

At 240, a network coupling the plurality of assist processing elements to the core processing element can be configured based on the one or more configuration bitstreams. In one implementation, the one or more networks can be directly configured based on the one or more configuration bitstreams. In another implementation, the one or more networks can be indirectly configured by the configuration of one or more serial interfaces and or one or more parallel interfaces of the assist processing elements and the core processing element.

At 250, one or more given applications can be executed on the configured processing unit. In one implementation, one or more neural network (NN) applications, such as but not limited to one or more long short-term memory (LSTM) NN applications, one or more multilayer perception (MLP) NN applications, one or more gated recurrent unit (GRU) NN applications, one or more attention NN applications, one or more sum/mean NN applications and or the like, can be executed on the configured processing unit.

The processes at 210-250 can be repeated to reconfigure the processing unit one or more times, at 260. For example, the processing unit can be configured at 210-250 for executing a first neural network application. The processing unit can then be reconfigured at 260 for executing a second neural network application. In another example, the processing unit can be configured for executing training modes of one or more graph neural network (GNN) applications during the night. The processing unit can then be reconfigured for executing inference modes of one or more graph neural network (GNN) application during the day. In the training modes, the processing unit can be configured for processing large data sets, providing high computation intensity and high data bandwidth. In the inference mode, the processing unit can be configured for processing smaller data sets, utilizing lighter weight computations and high data transfer rates.

Figures 3A, 3B:
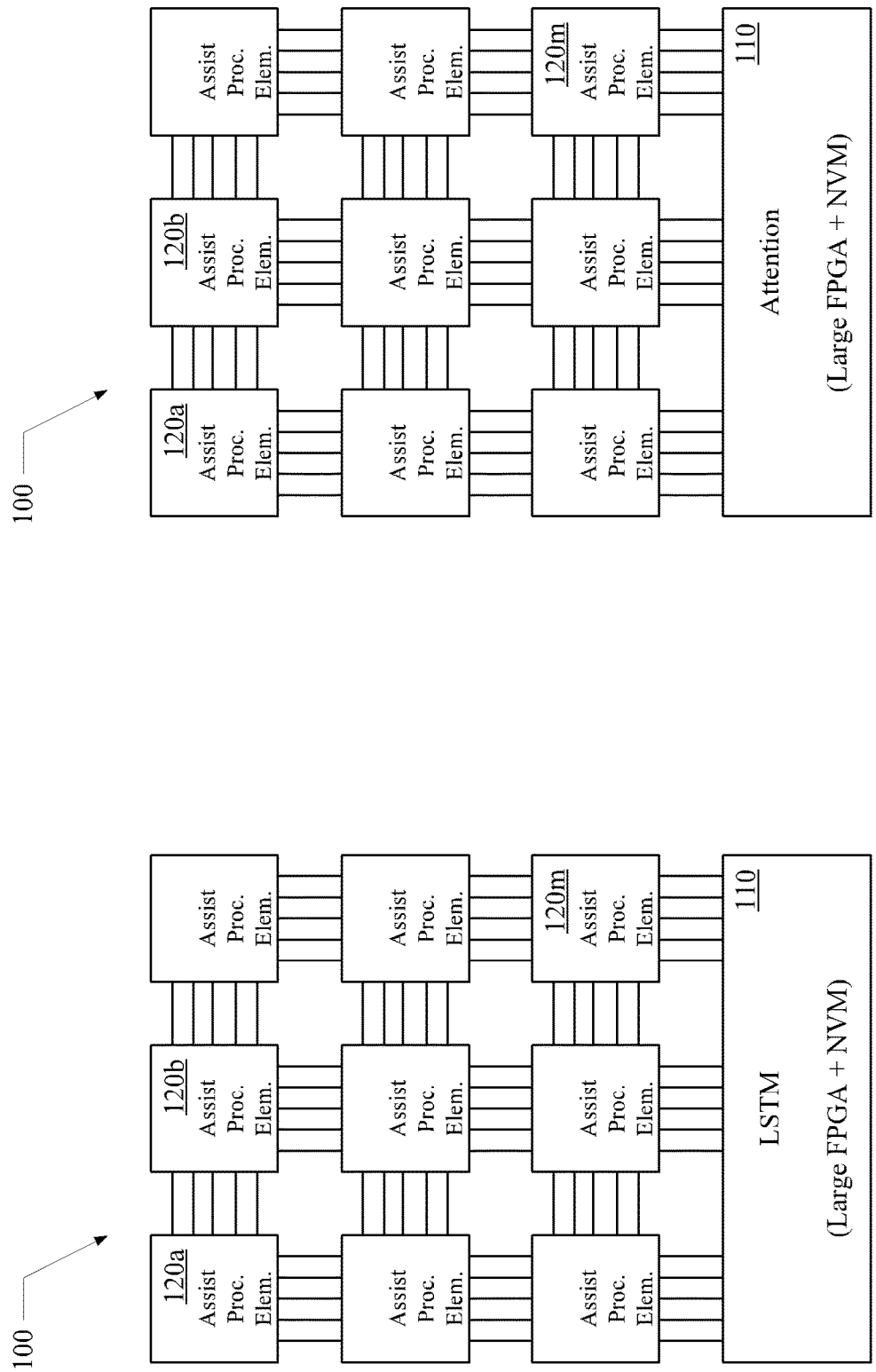
FIGS. 3A and 3B illustrate exemplary configurations of a processing unit, in accordance with aspects of the present technology.

Referring now to FIGS. 3A and 3B, exemplary configurations of a processing unit, in accordance with aspects of the present technology, are illustrated. The processing unit 100, in one implementation, can be configured for executing a long short-term memory (LSTM) neural network application as illustrated in FIG. 3A. The LSTM configuration can be optimized for training, sampling or inference. The processing unit 100 can then be reconfigured for executing an attention neural network application as illustrated in FIG. 3B. Again, the attention configuration can be optimized for training, sampling or inference.

Figures 4A, 4B:
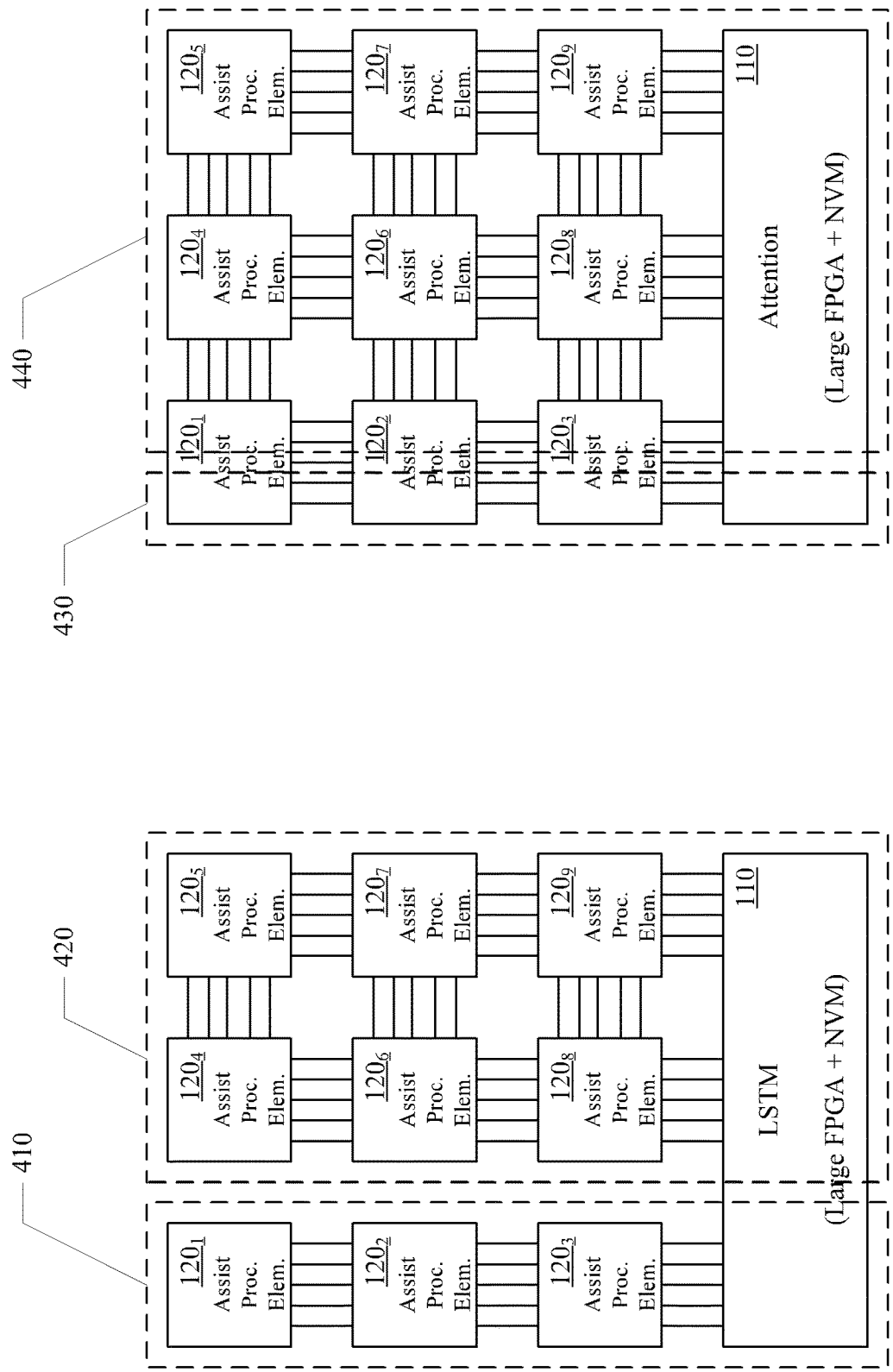
FIGS. 4A, 4B and 4C illustrate exemplary configurations of a processing unit, in accordance with aspects of the present technology.
Figure 4C:
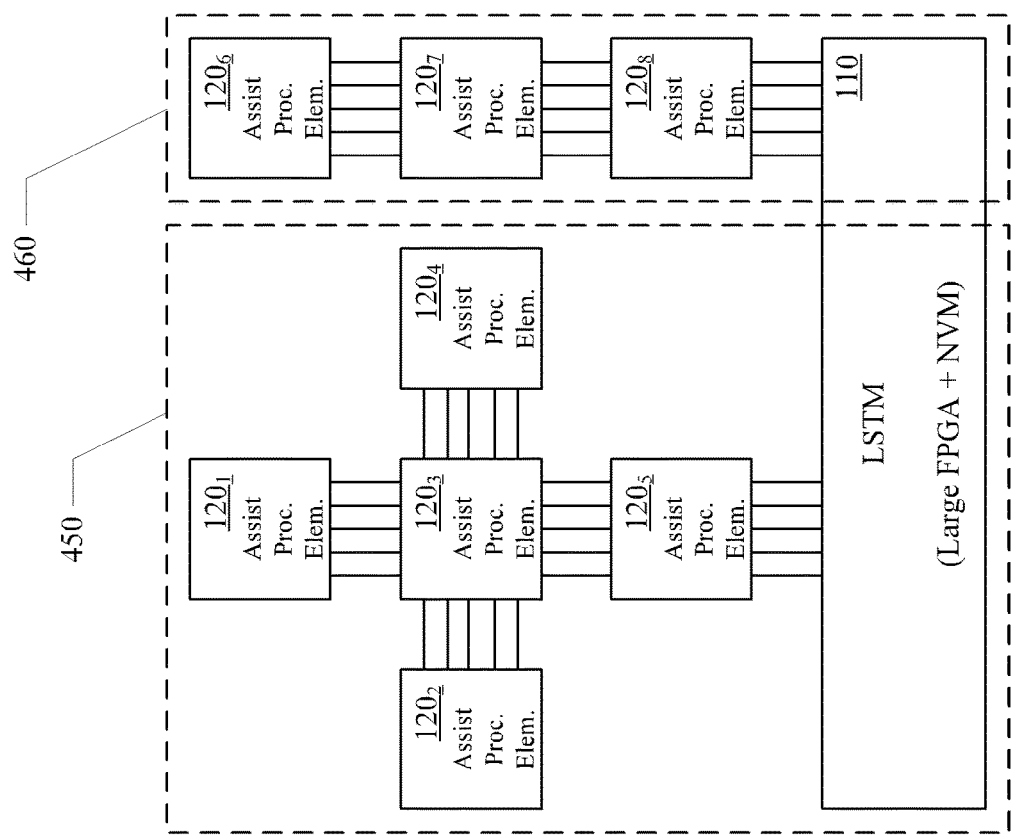

Referring now to FIGS. 4A, 4B and 4C, exemplary configurations of a processing unit, in accordance with aspects of the present technology, are illustrated. The processing unit 100, in one implementation can be configured for executing a plurality of applications. For example, a first portion of the core processing element 110 and a first subset of the assist processing elements $120_1$-$120_3$ can be configured for executing a first application 410. A second portion of the core processing element 110 and a second subset of assist processing elements $120_4$-$120_9$ can be configured for executing a second application 420, as illustrated in FIG. 4A. In another example, a portion of a set of assist processing elements $120_1$-$120_3$ can be shared between a first and second application 430, 440, as illustrated in FIG. 4B. In another example, the assist processing elements $120_1$-$120_5$ for executing a first application 450 can have a different configuration than the assist processing elements $120_6$-$120_8$ for executing a second application 460, as illustrated in FIG. 4C. Although FIG. 4C illustrates different configurations for interconnecting the assist processing elements 120 and the core processing element 110, the configurations can also different in memory capacity, memory bandwidth, logic functions and or the like. Furthermore, the above examples are non-limiting and are intended to illustrate that the core processing element 110 and the plurality of assist processing elements 120 can be configured in any number of different configurations for executing one or more applications in one or more modes.

Aspects of the present technology advantageously provide a configurable processing unit. The architecture of the processing unit can advantageously be configured and reconfigured for specific applications. The configurable architecture provides a flexible processing unit for use in executing multiple applications and or mode of execution. The processing unit also provides achieve improved performance for a given set of one or more applications by configuring the architecture based on the specific set of one or more applications. Aspects of the present technology can also advantageously reduce cost by providing configurable architecture that can be optimized for specific applications and or a wider range of applications.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A processing unit comprising:
a core processing element including processing logic and non-volatile memory having configurable computation resources and memory resources, wherein the core processing element is configurable based on one or more configuration bitstreams; and
a plurality of assist processing elements including processing logic and non-volatile memory having configurable memory resources and connection topology, wherein the plurality of assist processing elements are configurable based on the one or more configuration bitstreams,
one or more networks configured to couple the plurality of assist processing elements to the core processing element, wherein the one or more network is configurable based on the one or more configuration bitstreams, and wherein respective ones of the one or more configuration bitstreams are stored in the non-volatile memory of the respective ones of the plurality of assist processing elements and the respective core processing element.

2. The processing unit of claim 1, wherein the configurable computation resources of the core processing element includes a graph compute function.

3. The processing unit of claim 1, wherein the configurable memory resources of the core processing element includes configurable data flow.

4. The processing unit of claim 1, wherein:
the processing logic of the core processing element includes a field programmable gate array (FPGA); and
the non-volatile memory of the core processing element includes flash (FLASH) memory.

5. The processing unit of claim 1, wherein:
the processing logic of the plurality of assist processing elements include field programmable gate array (FPGA); and the non-volatile memory of the assist processing elements include flash (FLASH) memory.

6. The processing unit of claim 1, wherein the one or more networks comprises a mesh network.

7. The processing unit of claim 1, wherein the one or more configuration bitstreams are received from a host.

8. The processing unit of claim 7, further comprising one or more input/output interfaces configured to receive the one or more configuration bitstreams from the host.

9. A method of configuring a processing unit comprising:
accessing one or more configuration bitstreams;
configuring a core processing element of the processing unit based on the one or more configuration bitstreams;
configuring a plurality of assist processing elements of the processing unit based on the one or more configuration bitstreams;
configuring one or more networks coupling the plurality of assist processing elements to the core processing element based on the one or more configuration bitstreams, wherein the one or more configuration bitstreams are stored in non-volatile memory of the plurality of assist processing elements and the core processing element; and
execute one or more given applications on the processing unit.

10. The method according to claim 9, wherein accessing the one or more bitstreams includes receiving the one or more configuration bitstreams on one or more input/output interfaces of the processing unit.

11. The method according to claim 10, wherein accessing the one or more bitstreams includes receiving the one or more configuration bitstreams from a host device on the one or more input/output interfaces of the processing unit.

12. The method according to claim 9, wherein configuring the core processing element includes configuring computation logic of the core processing element based on the one or more configuration bitstreams.

13. The method according to claim 12, wherein configuring the core processing element includes one or more of:
configuring allocation of one or more computational resources of the computation logic;
configuring one or more functions of the computation logic;
configuring a node sampling strategy of the computation logic;
configuring an operation instruction set of the computation logic; and
configuring a memory resource of the core processing element.

14. The method according to claim 13, wherein configuring the core processing element includes allocation of computational resources for a single resident graph neural network (GNN) application or a plurality of residents (GNN) applications based on the one or more configuration bitstreams.

15. The method according to claim 13, wherein configuring the memory resources of the core processing element includes configuring a number of memory channels of the core processing element of the based on the one or more configuration bitstreams.

16. The method according to claim 13, wherein configuring the memory resources of the core processing element includes configuring a memory capacity of the core processing element of the based on the one or more configuration bitstreams.

17. The method according to claim 9, wherein configuring the plurality of assist processing elements include one or more of:
configuring memory management of the plurality of assist processing elements; and
configuring one or more network interfaces of the plurality of assist processing elements.

* * * * *